United States Patent [19]
Grauer et al.

[11] 3,715,921
[45] Feb. 13, 1973

[54] END-SEALED VARIABLE-AREA FLOWMETER

[75] Inventors: Oscar H. Grauer, Jenkintown; Omund A. Seglem, Doylestown; Erwin K. Kaucher, Souderton, all of Pa.

[73] Assignee: Fisher & Porter Company, Warminster, Pa.

[22] Filed: Oct. 6, 1971

[21] Appl. No.: 187,014

[52] U.S. Cl. ................................................. 73/209
[51] Int. Cl. .............................................. G01f 1/00
[58] Field of Search ...................................... 73/209

[56] References Cited

UNITED STATES PATENTS 3,141,331   7/1964   Wilson .................................. 73/209
3,416,370   12/1968  Kaucher et al. ....................... 73/209

*Primary Examiner*—James J. Gill
*Attorney*—Michael Ebert et al.

[57] ABSTRACT

A flowmeter of the rotometer type, wherein a variable-area meter tube is supported at its ends between inlet and outlet fittings. Each end fitting is permanently secured to the meter tube. This is accomplished by means of a hollow socket of corrosion-resistant material which is received within a well formed in the end fitting, the socket having a neck section of reduced diameter which engages the end of the tube. The annular region in the well surrounding the neck section and the tube end is filled with a compound serving to seal-in the socket and bond the tube end to the fitting.

14 Claims, 8 Drawing Figures

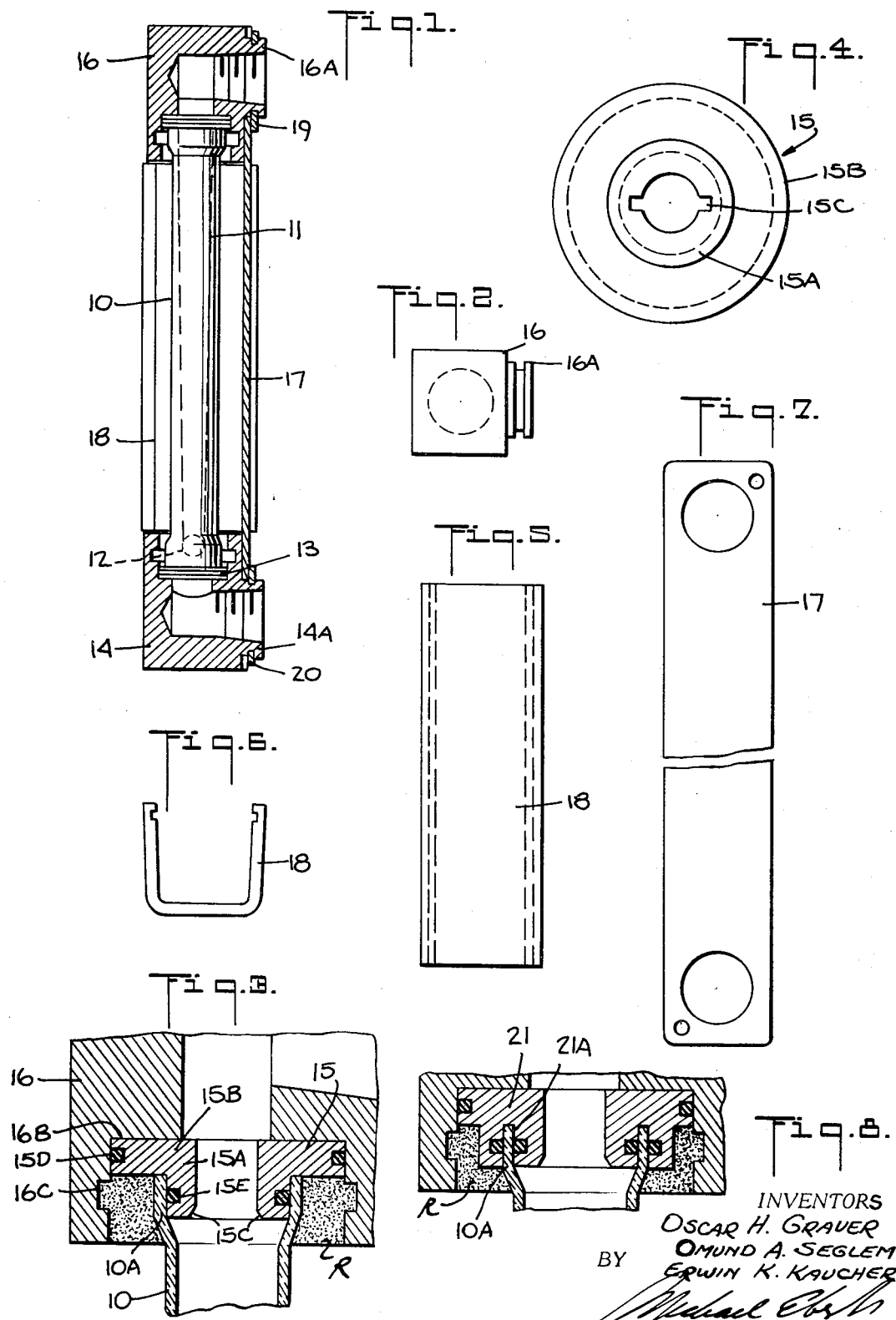

END-SEALED VARIABLE-AREA FLOWMETER

BACKGROUND OF THE INVENTION

This invention relates generally to a flowmeter of the rotometer type having a variable-area tube, and more particularly to a rotometer in which the meter tube is sealed to end fittings whereby fracture of the tube as a result of cross bending is avoided.

In the usual type of rotometer, a weighted plummet or float contained in an upright tapered tube is raised to a position of equilibrium between the downward force of the float and the upward force of the fluid flowing past the float through the annular orifice surrounding the float. The term "rotometer" was derived from the fact that plummets originally had slots therein to impart a rotational force for the purpose of centering and stabilizing the float. The present trend, however, is toward guided, non-rotating floats.

In one well-known commercial form of rotometer, such as that disclosed in the prior U.S. Pat. No. 3,342,068, in lieu of a tapered tube, the flowmeter is provided with a tube having a tapered bore affording a variable cross-sectional area. The float disposed in the bore assumes a vertical position depending on the rate of fluid flow, which may be liquid or gas. The vertical position of the float is indicated along a calibrated scale on the front of the tube.

Because the meter tube is made of glass and is relatively fragile, in existing variable-area tube flowmeters the tube is supported within end fittings mounted within a case adapted to protect the tube against stresses as well as to effect tight sealing thereof. In the typical arrangement, the end fittings for the tube are attached to the case at opposing positions therein, and inlet and outlet adapters are provided to facilitate insertion of the tube in the end fittings.

As operating pressure is increased in the flowmeter tube, the ends of the glass tube are subjected to a substantial pressure from the end fittings. Since the end fittings are confined within the case, the pressure on the end fittings is applied to the case. Because of the pressure developed at the ends of the tubes, there is a tendency for the case to warp, and as the case distorts it transmits a bending moment to the tube.

On a long, slender tube (i.e., 600 m.), the resultant cross-bending gives rise to a readily visible bow of ⅛ to ¼ inch. In a shorter tube, the amount of bowing is less evident to the naked eye, but it is reflected in lowered strength values for the tube.

It has been found that the bowing phenomenon experienced in conventional flowmeter tube arrangements will in some instances result in breakage of the tube. Thus the very meter case intended to protect the tube is responsible for damage thereto. Moreover, existing case or frame arrangements for variable-area flowmeters add materially to the cost of the meter.

Flowmeter tubes have heretofore been made leak-proof by means of an elastomeric (i.e., neoprene, viton, etc.) seal. This seal usually consisted of internal O-rings or of external packing. In both instances a precision formed surface produced either by reforming or external grinding, was required. In practice, these seals were often found to undergo leakage requiring troublesome readjustments. Also, with penetrating fluids such as heavy water where no leakage could be tolerated, it has been found that both the elastomeric O-ring and external packing gives rise to extensive leakage.

SUMMARY OF THE INVENTION

In view of the foregoing, it is the main object of this invention to provide a rotometer including a variable-area tube, which rotometer is of simple and inexpensive design and yet is such as to prevent cross-bending of the tube and possible fracture thereof.

Also an object of the invention is to provide a rotometer whose variable-area tube is permanently bonded and sealed to the end fittings therefor, thereby obviating leakage. Yet another object of the invention is to provide a rotometer structure of the above type, in which the end fittings therefor are not confined in a case, but are permanently secured to the ends of the meter tube, thereby avoiding cross-bending effects.

A significant advantage of the invention is that fewer parts are required than in conventional flowmeter structures, for there is no need for adapters to couple the ends of the tube to the end fittings, nor are separate stops necessary to limit the movement of the float in the tube. As compared to existing flowmeters, the present invention makes possible a less expensive, stripped-down version having fewer parts which, despite its simple structure, is more protective of the meter tube.

The present invention provides a novel means to effect a seal for the flowmeter that will be positive, stable and hermetic as well as being immune to leakage of such pervasive fluids as heavy water or others that cannot tolerate the slightest leakage. Such fluids may be radioactive materials, sanitary materials like food or drugs, pharmaceutical or biological materials, pure anhydrous chemicals that cannot tolerate contamination, or fluids that require complete isolation from the slightest diffusion of atmospheric moisture, oxygen, carbon dioxide, bacteria, etc.

Briefly stated, these objects are accomplished in a meter in which each end fitting is permanently secured to the associated end of the flow tube by means of a hollow spacer or socket of corrosion-resistant material recessed in a well formed in the end fitting, the socket being press-fitted or otherwise engaged to the tube end. The annular region in the well surrounding the tube end is filled with a compound serving to bond the tube end to the fitting and to seal in the socket.

OUTLINE OF THE DRAWING

For a better understanding of the invention, as well as other objects and further features thereof, reference is made to the following detailed description to be read in conjunction with the accompanying drawing, wherein:

FIG. 1 is a longitudinal section taken through a variable-area tube flowmeter in accordance with the invention;

FIG. 2 is an end view of the flowmeter;

FIG. 3 is an enlarged section showing the manner in which one end of the tube is secured by a socket to the outlet fitting of the flowmeter;

FIG. 4 is a plan view of the socket;

FIG. 5 is an elevational view of the cover;

FIG. 6 is an end view of the cover;

FIG. 7 is an elevational view of the back plate; and

FIG. 8 in section, shows another embodiment of a socket for use in the end fittings.

DESCRIPTION OF THE INVENTION

Referring now to the drawing, there is shown a flowmeter in accordance with the invention, which includes an open-ended, transparent meter tube 10, preferably fabricated of borosilicate glass, having a precision-molded, tapered bore 11 extending longitudinally therein, to provide a variable area to accommodate a float 12.

Float 12 preferably consists of a spherical ball of stainless steel or other non-corrodible material. The float, under fluid pressure, is raised in tube 10 from a lower stop 13 in the form of a hollow socket seated in an inlet fitting 14, to an upper stop 15 also in the form of a socket seated in an outlet fitting 16. Indicia are etched or otherwise formed along tube 10 to define a meter scale.

Although not essential to the meter structure, a back plate 17 made of stainless steel may be extended between and connected to fittings 14, and 16. The back plate provides mounting support and resists external pipe strain. Clipped onto back plate 17 is a transparent bezel or cover 18 made of flexible acrylic material, which bezel affords many-angled visibility as well as protection should the tube shatter.

Inlet and outlet fittings 14 and 16 are of identical construction, each having an internally-threaded nipple (14A and 16A) onto which pipes may be coupled to supply fluid for passage through the meter. The end fittings are preferably of a non-corrosive material of high strength, and for this purpose, one may use stainless steel, polyvinyl chloride, nylon, Penton or Kynar.

As shown in FIGS. 3 and 4, in connection with the outlet fitting 16, each end fitting is provided with a circular recess or well 16B, communicating with the central fluid passage and dimensioned to receive socket 15. Socket 15 has a base section 15B whose outer diameter substantially matches that of well 16B, whereby the socket is snugly seated in the well. The socket is provided with a neck section 15A of reduced diameter which is press-fitted within the enlarged bell 10A at the end of tube 10.

The hollow socket is preferably fabricated of Teflon, Kynar, or any other non-reactive resilient material. Alternatively, the socket may be made of stainless steel, a ceramic alumina, or of other materials.

The inner diameter of socket 15 is slightly smaller than that of the adjoining bore in tube 10, so that ball float 12 is stopped by the socket at the tube end, and there is no need for a separate stop element as in a conventional meter. A pair of diametrically-spaced 45° notches 15C on the inner diameter of the socket prevents the annulus of the washer from acting as a check valve with respect to the ball float.

The corrosion-resistant sockets serve to maintain the concentric position of the tube with respect to the circular wells in the end fittings, and also to cushion the tube against mechanical shock. In addition, the sockets act as a spacer to define an annular sealing region R surrounding the neck section 15A.

The sealing region R is filled with a cement, preferably in the form of an epoxy, and a suitable hardener mixture. The composition of the cement is such that when hardened, it provides a somewhat resilient seal. In order to permit the seal to withstand elevated temperatures, ground quartz or other powdered ceramic or vitreous material may be added to the mixture as well as powdered aluminum or stainless steel.

In practice, the cement may be injected by means of a hypodermic syringe, which may be hand-fed or activated by means of compressed air. This operation makes for rapid assembly, for a series of meters may be positioned on the rack and one tube after another may be quickly filled with cement. To avoid non-uniform transfer of stress, an annular groove 16C is cut in well 16B of the end fitting, the groove being filled with sealing cement and serving to lock the cement in the well.

The socket 15 is provided in its base section 15B with an annular groove 15D to produce high-pressure positive contact with the end fitting 16. The neck section 15A of the socket is provided with an annular groove 15E to improve the contact of the neck section with the inner diameter of the bell end 10A of the tube mounted thereon. In practice, O-rings may be inserted in grooves 15D and 15E.

The press-fit of the neck section of the socket against the bell end of the flowmeter tube, and of the base section of the socket against the well of the end fitting, provides in conjunction with the sealing compound, double protection against leakage.

Back plate 17 is provided with openings at either end thereof so that the plate is receivable on nipples 14A and 16A of the end fittings, the plate being clamped thereon by suitable retaining rings 19 and 20 fitting into circular grooves on the nipples. To prevent rotation of the fittings relative to the back plate, a pin may be inserted in the plate, which pin enters a bore in the end fitting. Back plate 17 may be coated with Kynar or Teflon to yield a meter that is completely corrosion-resistant to virtually all fluids in industrial use.

FIG. 8 shows another embodiment of a socket for use in conjunction with end fittings in accordance with the invention. This socket 21 mainly differs from sockets 14 and 15 shown in the other figures in that its neck section is provided with an annular groove to accommodate the end 10A of the flow tube, so that the socket engages both the inner and outer walls of the tube end.

The marked superiority of the above-described flowmeter tube "molecular" seal as compared to the conventional mechanical O-ring and packing seal has been established by the results of mass spectrometer tests run on these various types of seals.

When testing the "elastomeric" pressure seal in flowmeters having both O-ring and "packing" type configurations, leakage could be readily detected with the helium mass spectrometer set at $10^{-5 tor}$. With the "molecular" type seal used for the new end sealed flowrator, no detectable leak could be observed with the mass spectrometer set at $10^{-8}$ tor. Since the maximum leakage permitted for use with heavy water is $1 \times 10^{-5\, tor}$, the inadequacy of the old type of flowmeter contrasts very sharply with the extreme hermetic property of the end sealed flowmeter in accordance with the invention.

While there have been shown and described preferred embodiments of end-sealed variable-area flowmeters in accordance with the invention, it will be appreciated that many changes and modifications may be made therein without, however, departing from the essential spirit of the invention.

We claim:

1. A rotometer comprising:
   A. a tube formed of transparent material and having a tapered longitudinal bore therein affording a vertical fluid passage having a variable cross-sectional area,
   B. a float disposed in said bore, said float assuming a vertical position therein depending on the rate of fluid flow in said fluid passage, and
   C. inlet and outlet fittings secured to opposing ends of said tube and connectable to a fluid line, each of said fittings including a well communicating with said line, a hollow socket seated in said well, said socket having a constricted neck section engaging the related end of said tube, the area in said well surrounding said neck section and the tube end defining an annular region, and a sealing compound filling said region to permanently maintain said tube end and said socket within said fitting.

2. A rotometer as set forth in claim 1, wherein the ends of said tube engaged by said neck sections are enlarged to form a bell.

3. A rotometer as set forth in claim 1, wherein the inner diameter of said socket is slightly smaller than that of the bore in the adjoining end of the tube, whereby said socket acts as a stop with respect to said float.

4. A rotometer as set forth in claim 1, wherein the neck section of said hollow socket is provided with an annular groove to receive said tube end.

5. A rotometer as set forth in claim 1, further including a back plate extending between said fittings and removably attached thereto.

6. A rotometer as set forth in claim 5, wherein said plate is coated with a corrosion-resistant material.

7. A rotometer as set forth in claim 5, further including a transparent cover having a U-shaped cross-section, the side arms of said cover being adapted to slip onto the edges of said cover.

8. A rotometer as set forth in claim 1, wherein said socket is fabricated of a corrosion-resistant plastic material which is non-reactive with respect to said fluid.

9. A rotometer as set forth in claim 6, wherein said socket is made of a material chosen from the class consisting of Teflon and Kynar.

10. A socket as set forth in claim 6, wherein said socket is provided with an annular groove on the outer surface of said neck section.

11. A socket as set forth in claim 1, wherein said well is provided with an annular groove which is filled with said sealing compound.

12. A socket as set forth in claim 1, wherein said sealing compound is in the form of an epoxy composition.

13. A socket as set forth in claim 12, wherein said compound includes additives to cause said compound to withstand elevated temperatures.

14. A rotometer as set forth in claim 1, wherein said end fittings and said sockets are made of the same material to form an integral structure.

* * * * *